United States Patent
Panteleev et al.

(10) Patent No.: US 10,839,591 B2
(45) Date of Patent: Nov. 17, 2020

(54) STEREOSCOPIC RENDERING USING RAYMARCHING AND A VIRTUAL VIEW BROADCASTER FOR SUCH RENDERING

(71) Applicant: Nvidia Corporation, Santa Clara, CA (US)

(72) Inventors: Alexey Panteleev, Santa Clara, CA (US); Dmitry Duka, Moscow (RU)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 15/862,341

(22) Filed: Jan. 4, 2018

(65) Prior Publication Data

US 2018/0190007 A1    Jul. 5, 2018

Related U.S. Application Data

(60) Provisional application No. 62/442,366, filed on Jan. 4, 2017.

(51) Int. Cl.
| | |
|---|---|
| *G06T 15/06* | (2011.01) |
| *G06T 15/20* | (2011.01) |
| *H04N 13/161* | (2018.01) |
| *H04N 13/243* | (2018.01) |
| *H04N 13/257* | (2018.01) |

(Continued)

(52) U.S. Cl.
CPC ............ *G06T 15/06* (2013.01); *A63F 13/212* (2014.09); *A63F 13/335* (2014.09); *A63F 13/355* (2014.09); *G06F 3/011* (2013.01); *G06T 15/20* (2013.01); *G06T 19/003* (2013.01); *H04N 13/117* (2018.05); *H04N 13/161* (2018.05); *H04N 13/243* (2018.05); *H04N 13/257* (2018.05); *H04N 13/261* (2018.05); *H04N 13/275* (2018.05); *H04N 13/279* (2018.05); *H04N 13/344* (2018.05); *H04N 21/2187* (2013.01); *H04N 21/21805* (2013.01); *H04N 21/6587* (2013.01); *H04N 21/816* (2013.01);

(Continued)

(58) Field of Classification Search
CPC .... A63F 13/355; A63F 13/212; A63F 13/335; A63F 2300/538; A63F 2300/66; G06T 15/06; G06T 3/011; G06T 15/20; G06T 19/003; H04N 21/816; H04N 21/6587; H04N 21/21805; H04N 21/2187; H04N 13/161; H04N 13/261; H04N 13/243; H04N 13/257; H04N 13/271
See application file for complete search history.

(56) References Cited

U.S. PATENT DOCUMENTS

| | | |
|---|---|---|
| 5,995,742 A | 11/1999 | Jannson et al. |
| 7,009,615 B1 | 3/2006 | Kilgard et al. |

(Continued)

OTHER PUBLICATIONS

Adelson et al., "Stereoscopic ray tracing", Graphics, Visualization, and Usability Center, College of Engineering, Georgia Institute of Technology, 1993 (Year: 1993).*

(Continued)

*Primary Examiner* — Diane M Wills (57) ABSTRACT

The disclosure provides a virtual view broadcaster, a cloud-based renderer, and a method of providing stereoscopic images. In one embodiment, the method includes (1) generating a monoscopic set of rendered images and (2) converting the set of rendered images into a stereoscopic pair of images employing depth information from the monoscopic set of rendered images and raymarching.

21 Claims, 8 Drawing Sheets

(51) Int. Cl.
H04N 13/261 (2018.01)
H04N 21/218 (2011.01)
H04N 13/279 (2018.01)
A63F 13/355 (2014.01)
H04N 21/6587 (2011.01)
H04N 21/81 (2011.01)
H04N 13/344 (2018.01)
H04N 13/117 (2018.01)
H04N 13/275 (2018.01)
A63F 13/212 (2014.01)
A63F 13/335 (2014.01)
G06F 3/01 (2006.01)
G06T 19/00 (2011.01)
H04N 21/2187 (2011.01)
H04N 13/271 (2018.01)

(52) U.S. Cl.
CPC ..... A63F 2300/538 (2013.01); A63F 2300/66 (2013.01); H04N 13/271 (2018.05)

(56) References Cited

U.S. PATENT DOCUMENTS

2004/0222988 A1* 11/2004 Donnelly ............... A63F 13/10
345/419
2008/0106549 A1 5/2008 Newhall, Jr. et al.
2013/0063549 A1 3/2013 Schnyder et al.
2013/0100132 A1 4/2013 Katayama et al.
2014/0038708 A1 2/2014 Davison et al.
2014/0113718 A1 4/2014 Norman et al.
2015/0055937 A1* 2/2015 Van Hoff ............. H04N 13/243
386/285
2016/0353090 A1 12/2016 Esteban et al.
2016/0361658 A1 12/2016 Osman et al.
2017/0104927 A1 4/2017 Mugavero et al.
2017/0324951 A1 11/2017 Raveendran et al.
2018/0005447 A1 1/2018 Wallner et al.
2018/0007339 A1 1/2018 Castleman
2018/0096453 A1* 4/2018 Edwards ............. H04N 13/122
2018/0108110 A1* 4/2018 Cuervo ................. G06F 3/011
2018/0192081 A1 7/2018 Huang et al.

OTHER PUBLICATIONS

Stone, et al.; "Immersive Molecular Visualization with Omnidirectional Stereoscopic Ray Tracing and Remote Rendering"; IEEE Int Symp Parallel Distrib Process Workshops Phd Forum; May 2016; Published online Aug. 4, 2016; 25 pgs.

* cited by examiner

STEREOSCOPIC RENDERING USING RAYMARCHING AND A VIRTUAL VIEW BROADCASTER FOR SUCH RENDERING

CROSS-REFERENCE TO RELATED APPLICATION

This application claims the benefit of U.S. Provisional Application Ser. No. 62/442,366, filed on Jan. 4, 2017, entitled "CLOUD GENERATION OF CONTENT TO BE STREAMED TO VR/AR PLATFORMS USING CLOUD SERVERS AND RENDERING OF STEREOSCOPIC 360-DEGREE PANORAMAS USING RAYMARCHING AND DEPTH INFORMATION," commonly assigned with this application and incorporated herein by reference in its entirety.

TECHNICAL FIELD

This application is directed, in general, to rendering and, more specifically, to rendering stereoscopic images.

BACKGROUND

Many computer graphic images are created by mathematically modeling the interaction of light with a three-dimensional (3D) scene from a given viewpoint. This process, called "rendering," generates a two-dimensional (2D) image of the scene from the given viewpoint and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high-level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

With the accelerated rendering provided by these computer systems, various applications, such as video games, use cloud-based rendering. Through this technology, users can enjoy a virtual graphics experience on their computing devices, including virtual reality headgear, such as a head mounted display (HMD). The cloud-based platform also allows users to remotely compete against others in tournaments or sporting events over a communications network. In addition to those who are actively participating in a video game or application, passive viewers who are watching but not playing or actively participating, at video game tournaments or other eSport events can view an ongoing game on their computing device through the viewpoint of one of the players.

SUMMARY

In one aspect, the disclosure provides a method of providing stereoscopic images. In one embodiment, the method includes: (1) generating a monoscopic set of rendered images and (2) converting the set of rendered images into a stereoscopic pair of images employing depth information from the monoscopic set of rendered images and raymarching.

In another aspect the disclosure provides a virtual view broadcaster. In one embodiment, the virtual view broadcaster includes: (1) a cloud-based renderer configured to generate a 360 degree, monoscopic set of rendered images and employ raymarching and depth information to convert the set of rendered images into a 360 degree stereoscopic pair of images, and (2) an image processor configured to encode the stereoscopic pair of images for video transmission.

In yet another aspect the disclosure provides a cloud-based renderer. In one embodiment, the cloud-based renderer includes (1) a memory, and (2) at least one processor coupled to the memory and configured to convert a cube map, employing raymarching and a depth buffer of the cube map, to a stereoscopic pair of cube maps.

BRIEF DESCRIPTION

Reference is now made to the following descriptions taken in conjunction with the accompanying drawings, in which.

DETAILED DESCRIPTION

With the recent growth in the virtual reality headset area, 360-degree panoramic photos and videos have become more popular. There are two kinds of such panoramas: monoscopic and stereoscopic. Monoscopic panoramas are typically easy to capture, process and display, but they obviously lack any depth information. Stereoscopic panoramas are much more complicated to capture or generate.

One way to capture surround depth in just two images is to project the objects onto the images in such a way that each column of image pixels corresponds to a set of rays going from a point on a projection circle whose diameter is equal to interpupillary distance (IPD). This can be compared to regular perspective projection where all rays are going from the same point: the camera center. A projection circle is a circle having a diameter equal to IPD that surrounds a projection center for computing the regular perspective projection. The projection circle corresponds to eye positions as one rotates their head with the projection center being the center of rotation.

When stereo panoramas are composited from photos or rendered images, the number of images taken along the horizontal direction should be maximized, and each image should be taken from a different point on the aforementioned circle. Then the central vertical bands of these images can be stitched and blended together to obtain an approximation to the intended special projection. For an ideal result, the number of input images for each eye should equal the width of the output panorama in pixels—which is obviously impractical. Using fewer images, however, produces a panorama that has incorrect depth representation when viewed in a direction that is not perpendicular to any source pair of images (right and left). Any number of source images that is suitable for real-time rendering produces obviously incorrect depth in most viewing directions, along with significant stitching artifacts on nearby objects visible as ghosting.

It is realized herein that rendering methods that are not bound to a regular perspective projection—such as ray tracing or raymarching with analytical scene representation—can be used to produce a projection without stitching artifacts, including the circular projection needed for stereo panoramas. Using the disclosed rendering processes, a viewpoint can be shifted wherein rays are traced from points on a projection circle. The original rendered image (non-circular) from the original viewpoint is employed as source data for tracing rays from the points on the projection circle.

The disclosures provides a virtual view broadcaster that employs a set of rendered images, including their depth buffers, to compute a regular perspective projection from a point close to the projection center of the original environment map or images, but not necessarily matching the exact center. The set of rendered images can be a 360 degree, monoscopic set of rendered images such as a monoscopic cube map. Similarly, two projections can then be computed, one per eye, for any position and orientation of a user, such as from a user's head wearing an HMD.

The disclosed virtual view broadcaster computes a stereoscopic panorama with a perfect or near perfect circular projection employing an algorithm that uses the monoscopic set of rendered images and their depth buffers. A renderer can use scene geometry, scene description, etc., to render the monoscopic set of images. The monoscopic set of rendered images can be a cube map that has six square images, each one representing a perspective projection of a view towards one of the major axes. Each of the cube map faces has information about depth. Given an arbitrary ray, surface information can be determined by finding the intersection of the ray with the surfaces described by the depth buffers of the cube map.

In one embodiment, raymarching is used to cast each ray that corresponds to an output pixel in the panorama from its own pixel point, i.e., each pixel's own viewpoint. In some embodiments, raymarching can be performed by employing a depth view map. In some embodiments ten taps of a depth mipmap are sufficient to determine the surface to use. A depth mipmap, also referred to as MIP map, are precalculated, optimized sequences of images wherein each of the sequences of images is a progressively lower resolution representation of the same image. In embodiments employing a depth buffer, mipmaps are generated by finding the closest surface among the higher resolution input pixels used to compute a single lower resolution output pixel. This is unlike color mipmaps where color pixels usually are simply averaged. FIGS. 3A to 3D provide an example of employing mipmaps during raymarching.

A difference between computing a regular perspective projection and a stereoscopic panorama is in computing the desired ray origin and direction for each output pixel. For computing the regular perspective projection, the origin is the projection center (eye position) and the direction can be computed using view and projection matrices and pixel coordinates. For computing the stereoscopic panorama, the direction can be computed based on the output pixel coordinates in the panorama, and the ray origin is computed based on the panorama center and the direction, and is located on the projection circle. Thus, when computing panorama views, regardless whether the projection or layout of monoscopic rendered views is a cube or an equirect, for each output pixel the disclosed method, system, or apparatus can determine a view direction in which the pixel corresponds. For example, having an equirectangular projection, for an x, y, pixel location geometry can be used to determine the view direction.

Figure 6:
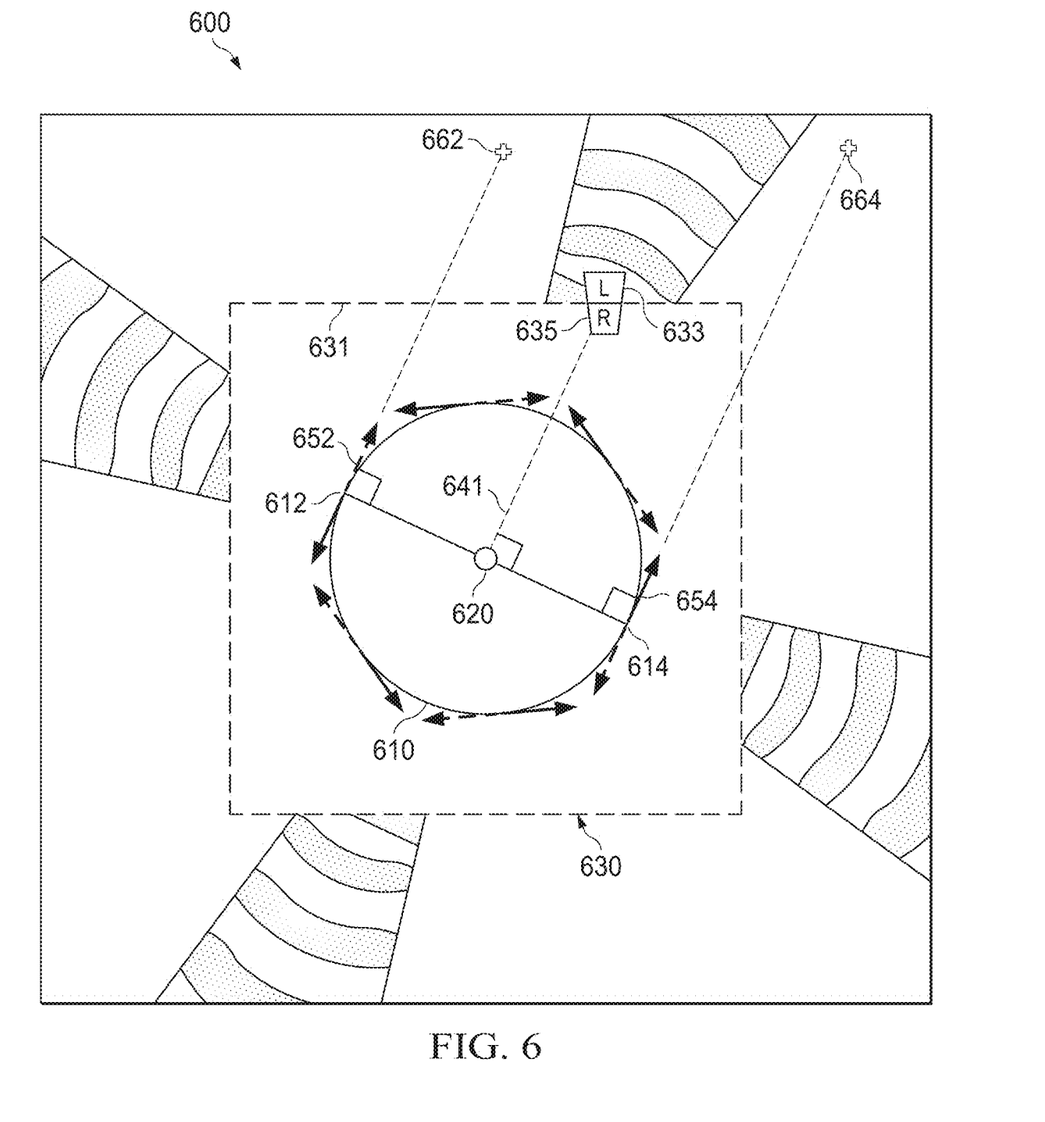
FIG. 6 illustrates a diagram of an example using geometry to determine a view direction with respect to a cube map according to the principles of the disclosure.

For stereoscopic panoramas a projection point lies on the projection circle. Since the projection circle lies in the horizontal plane, a projection point is where the projection of a direction vector onto the horizontal plane is tangent to the projection circle. Given a direction the projection point can be adjusted to lie on the projection circle. There are two projection points on the projection circle that are separated by the diameter. One of the projection points is for the left eye and one is for the right eye. Regarding a cube map, geometry can also be used to determine a view direction. FIG. 6 discussed below provides an example.

After the ray origin and direction are determined, raymarching is employed. That is, the ray is projected onto the environment map or the images, and the depth buffers are sampled along the ray until an intersection between the ray and the implicit surface encoded by the depth buffer is found.

In some embodiments, the ray origin may not match any of the images' projection centers and there can be insufficient information about the scene due to parallax and occlusion. Simply put, when you take a picture of a tree, you don't know what's directly behind that tree—but that may be important for other viewpoints. To compensate, the disclosed virtual view broadcaster or a portion thereof, is configured such that when based on a set of images, these images can be taken from slightly different viewpoints, which greatly improves the chance that every required surface will be found in at least one image. If a cube map is used, a second layer of that cube map can be rendered. This layered rendering is known as depth peeling and can provide additional data for processing occlusions. Then the raymarching algorithm can pick the right layer based on, for example, the similarity between the current point on the ray and both depth values in the cube map, or other information such as surface orientation or depth gradients.

Figure 1:
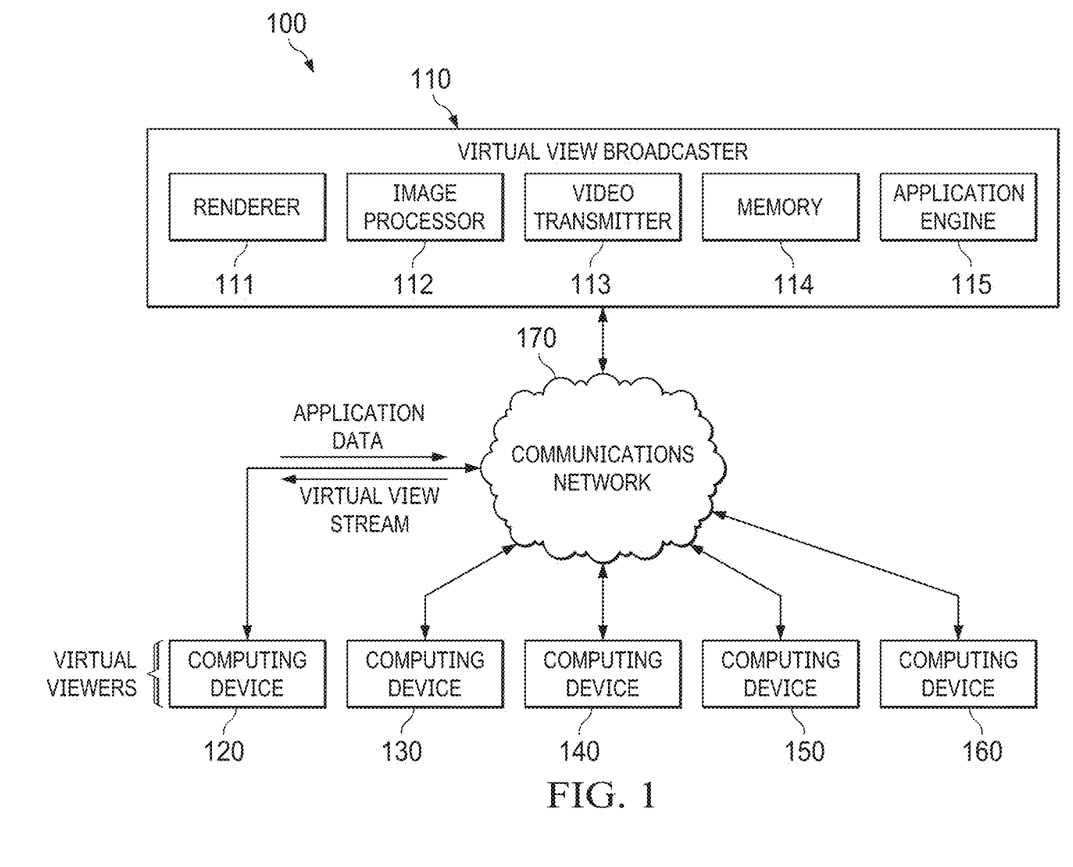
FIG. 1 illustrates a block diagram of an embodiment of a virtual view broadcasting system constructed according to the principles of the disclosure.

Turning now to the Figures, FIG. 1 illustrates a block diagram of an embodiment of a virtual view broadcasting system 100 constructed according to the principles of the disclosure. The virtual view broadcasting system 100 includes a virtual view broadcaster 110, computing devices 120, 130, 140, 150, 160, and a communications network 170. The computing devices 120, 130, 140, 150, 160, are collectively referred to as computing devices 120-160, and are communicatively coupled to the virtual view broadcaster 110 via the communications network 170. The communications network 170 can be a conventional network, such as the Internet, that allows connected computing devices to communicate with each other.

The virtual view broadcaster 110 is configured to generate virtual view streams of a stereoscopic pair of images from a monoscopic set of rendered images. The monoscopic set of rendered images can be generated from a virtual camera positioned in an application. In one embodiment, game publishers or other application developers can be provided with designated code for them to incorporate in their game or application to install virtual cameras therein. The designated code can correspond with a renderer of the virtual view broadcaster 110 to provide the rendered images when a particular virtual camera is selected. The virtual view broadcaster 110 can receive a selection input from a camera selector to determine the virtual camera to use. In some embodiments, multiple selection inputs can be received for different virtual cameras and the virtual view broadcaster 100 can simultaneously generate the virtual views for the multiple virtual cameras selected. The camera selector can be a designated person or a computing device thereof that is used to provide the selection input to the virtual view broadcaster 100. The computing device can be one of the computing devices 120-160.

The virtual view broadcaster 110 can be implemented on a server or on multiple servers of a cloud computing platform. The virtual view broadcaster 100 provides a set of monoscopic rendered images that are then used to generate a stereoscopic pair of images for 360 degrees of virtual views. Accordingly, the virtual view broadcaster 100 can create a virtual reality experience from an application that is not a virtual reality application.

The virtual view broadcaster 110 can include at least one CPU and multiple GPUs. In the illustrated embodiment, the virtual view broadcaster 110 includes a renderer 111, an image processor 112, a video transmitter 113, a memory 114, and an application engine 115. The memory 114 can be a conventionally memory or memories typically employed with servers. The application engine 115 includes the operating instructions that correspond to the algorithms employed to generate scenes, such as a game engine providing scenes from a video game.

The renderer 111 generates a set of monoscopic rendered images and converts the monoscopic images to a stereographic pair of images employing raymarching. The renderer 111 can be a cloud-based renderer that generates the set of monoscopic rendered images from various virtual cameras positioned in an application. In one embodiment the rendered images correspond to six sides of a cube map for a virtual camera location. The renderer 111 can generate other rendered images that can be combined to provide a virtual view of 360 degrees. In some embodiments, the rendered images can be for equirectangular views instead of cube maps. The rendered images correspond to application data received from, for example, the computing devices 120-160 of the virtual viewers. The application data can include scene data. In some embodiments, the application data can include directional information that indicates a viewing direction a virtual viewer is looking towards, selecting, pointing at, etc.

As noted above, the renderer 111 can provide the set of monoscopic rendered images by rendering six images that form a cube at the camera location. The cube map is then used for texturing of a scene of the application. Cube map texturing is a form of texture mapping that uses a 3D direction vector to index into a texture that is six square 2D textures arranged like the faces of a cube. Since rendering of cube maps is more complex than rendering regular views into 2D textures, GPU's are often employed with a CPU. For example, Nvidia Grid™ technology can be employed to provide the renderer and rendering schemes disclosed herein to support rendering of the images, such as cube map rendering. Nvidia Grid™ is by Nvidia Corporation of Santa Clara, Calif., and provides a graphics virtualization platform that allows the power of Nvidia GPU technology to be used by virtual desktops and applications. The renderer 111 can include additional components such as a memory and a communications interface.

The image processor 112 encodes the stereoscopic pair of images into virtual view streams for transmission. The image processor 112 can also provide additional functions such as reformatting and image processing. The encoded stereoscopic pair of images are then provided to the video transmitter 113 and sent to the computing devices 120-160. The video transmitter 113 can be a conventional device that receives encoded frames and transmits them as a video stream. Instead of being included within the virtual view broadcaster 110, in some embodiments the video transmitter 113 can be conventionally coupled to the virtual view broadcaster 100 and used for transmission of the virtual view streams of the stereoscopic pair of images. The video transmitter 113 is a video proxy server.

The virtual view streams of stereoscopic images provided to the different computing devices 120-160 can be from the same virtual camera and can be the same video stream. In some embodiments, a virtual viewer can determine their actual view based on the directional information provided through their respective computing devices 120-160, such as an HMD.

The computing devices 120-160 can be VR headgear, smartphones, desk top computers, laptops, computing pad, tablet, etc. The computing devices 120-160 can be thin clients that communicate with the virtual view broadcaster 110 and provide sufficient application data thereto for rendering and stitching. Each of or at least some of the computing devices 120-160 can be different types of devices. For example, computing devices 120-140 can be VR headgears, computing device 150 can be a laptop, and computing device 160 can be an Nvidia SHIELD Tablet.

Figure 2:
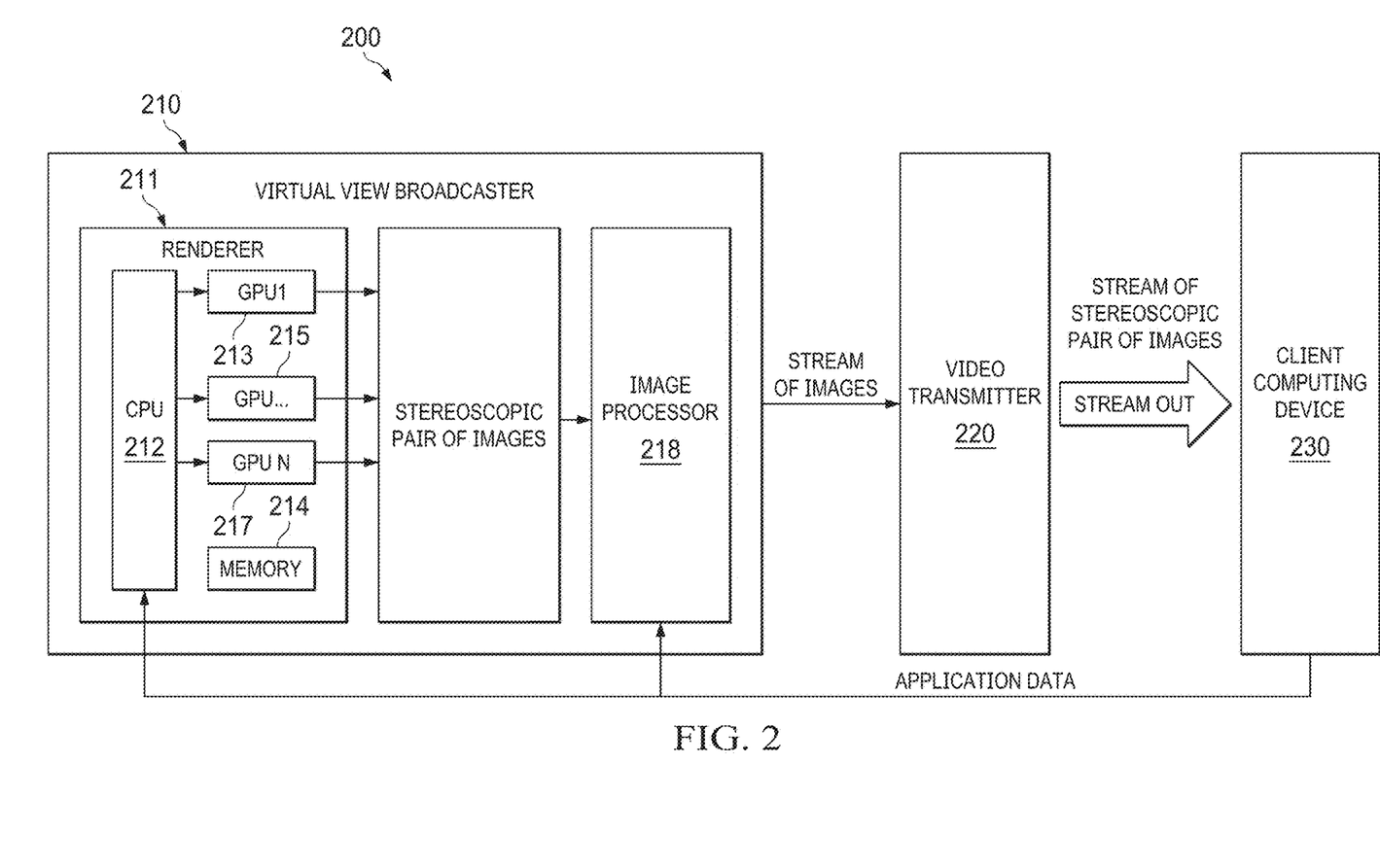
FIG. 2 illustrates a block diagram of an embodiment of a virtual view broadcasting system constructed according to the principles of the disclosure that illustrates the operational flow for providing a virtual view stream of a stereoscopic pair of images to a client computing device.

FIG. 2 illustrates a block diagram of an embodiment of a virtual view broadcasting system 200 constructed according to the principles of the disclosure that illustrates the operational flow for providing virtual view streams of a stereoscopic pair of images to a client computing device. The virtual view broadcasting system 200 includes a virtual view broadcaster 210, a video transmitter 220, and a client computing device 230. In some embodiments, the virtual view broadcaster 110 of FIG. 1 is configured as and functions as the virtual view broadcaster 210.

The virtual view broadcaster 210 is configured to generate a virtual view stream of a stereoscopic pair of images for the client computing device 230. The stereoscopic pair of images can be from one or more virtual cameras positioned in an application based on application data. In one embodiment, the virtual view broadcaster 210 is a cloud-based device, such as a cloud server (or servers), that generates content in the cloud to be streamed to the client computing device 230. The virtual view broadcaster 210 can be implemented on one or more network (e.g., cloud) servers to render content in a real time (or semi-real time) content engine and to create a set of monoscopic rendered images that are employed to generate a 360 degree video for streaming a stereoscopic pair of images to virtual viewers in real-time or semi-real time. Real time is a level of responsiveness sensed by a user as sufficiently immediate or that enables a processor to keep up with processing of an inputs. In some embodiments, the input data can be processed within milliseconds so that it is available virtually immediately as feedback. The virtual view broadcaster 210 includes a renderer 211 and an image processor 218. In some embodiments, the virtual view broadcaster 210 also includes the video transmitter 220. The renderer 211 can be a cloud-based renderer.

The renderer 211 generates rendered data sets of monoscopic images and converts the monoscopic rendered images into a stereoscopic pair of images. The renderer 211 employs image-based raymarching to convert the monoscopic set of rendered images having color and depth into the stereoscopic pair of images. The raymarching can provide perfect or near perfect circular projection with minor artifacts due to disocclusion that can be addressed with available workarounds for the artifacts. After raymarching, the renderer 211 can perform additional rendering steps such as applying translucent geometry processing and post-translucency effects (tone mapping) on each of the stereoscopic pair of images.

The renderer 211 can generate the images for applications or technology that require multiple representations generated in real-time, such as for a VR or AR display. The data sets can correspond to multiple views (e.g., cube views). As such, the renderer 211 can draw six rendered images that can be used to provide 360 degree views. Using a game application as an example, the renderer 211 can generate the six rendered images by calling the rendering function of a game engine six times.

The renderer 211 includes a central processing unit (CPU) 212 that is coupled to multiple graphics processing units (GPU) 213, 215, 217. The number of CPUs or GPUs can vary in different renderer embodiments. The GPUs can be configured to render entire, separate panorama views or every GPU can render one frame of the same view. In some embodiments, the virtual view broadcaster 210 can include multiple renderers or a single renderer having multiple CPUs that are each paired with multiples GPUs.

The renderer 211 includes a memory 214 that includes a series of operating instructions that direct the operation of the renderer 211. The series of operating instructions correspond to algorithms that direct the rendering process according to the stereoscopic rendering as disclosed herein. The memory 214 can be coupled to the CPU 212 and the GPUs and cooperate with the CPU 212 and the GPUs 213, 215, 217, to render the stereoscopic pair of images. The renderer 211 can also include or interact with other components, such as an application engine, coupled to the CPU 212, the memory 214, or the GPUs 213, 215, 217, that are used to generate the rendered images.

The CPU 212 is configured to cooperate with the GPUs 213, 215, 217, to generate the monoscopic set of rendered images. The CPU 212 can send scene information to the GPUs 213, 215, 217, for additional processing to generate images or frames for a particular viewpoint. For example, the CPU 212 can use application data from the client computing device 230 to determine scene information like vertex positions, triangle connectivity, textures, material properties, light sources, etc., and pass this information to the GPUs 213, 215, 217, to paint the pixels of the rendered images. In some embodiments, the client computing device 230 can send action or movement information via the communications network 170 that will indirectly affect the vertex positions. Thus, the application data from the client computing device 230 can include only some of the scene data.

The renderer 211 sends the generated stereoscopic pair of images to the image processor 218. The stereoscopic pair of images can be a 360 degree stereoscopic pair of images. The image processor 218 performs compression, encoding to a video stream for transmission, reformatting and image processing on the stereoscopic pair of images. The image processor 218 can include an encoder that encodes into standard protocol video streams, such as H.264, HVEC, etc. The image processor 218 then sends the encoded, virtual view streams of the stereoscopic pair of images to the video transmitter 220 for streaming.

The video transmitter 220 receives the encoded video stream and transmits the virtual view stream of the stereoscopic pair of images to the client computing device 230. The video transmitter 220 can be a video proxy server. The client computing device 230 can be one of the computing devices 120-160 of FIG. 1.

The client computing device 230 displays a virtual view employing the virtual video stream of the stereoscopic pair of images received from the video transmitter 220. The client computing device can also send application data to the virtual view broadcaster 210 to be used for real time generation and processing of content.

FIGS. 3A, 3B, 3C, and 3D illustrate diagrams demonstrating the application of raymarching to a cube map according to the principles of the disclosure. A renderer as disclosed herein can perform the raymarching to convert a monoscopic cube map to a stereoscopic cube map.

Figure 3A:
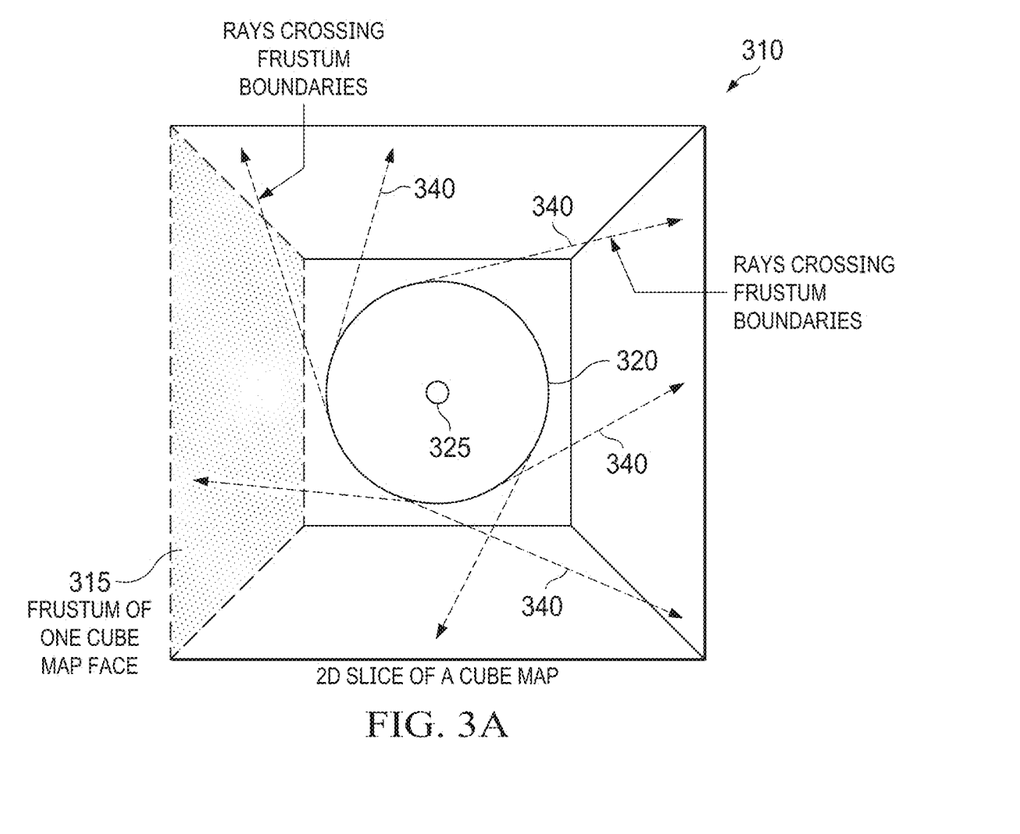
FIGS. 3A, 3B, 3C, and 3D illustrate diagrams demonstrating the application of raymarching to a cube map according to the principles of the disclosure.

FIG. 3A illustrates a two dimensional view of a cube map 310. Within the cube map 310 is a projection circle 320 having a projection center 325. The cube map 310 has several faces, wherein face 315 is denoted. Multiple rays, generally noted as rays 340, are shown projecting from multiple projection points on the projection circle 320 and crossing frustum boundaries of the faces of the cube map 310. All of the rays 340 originate from the projection circle 320, but some of them just go to one face of the cube map 310 while others cross between multiple faces of the cube map 310. In a three dimensional cube map, a single ray can go through three separate faces of a cube map.

Figure 3B:
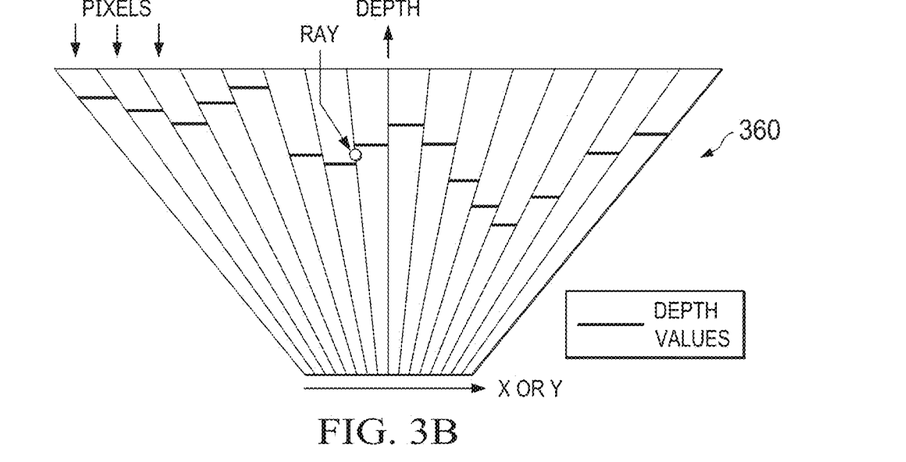

FIG. 3B illustrates an example of a cross-section of a frustum 360 of one cube map face, such as face 315. The frustum 360 has some pixels in the horizontal dimension (three are denoted in FIG. 3B), each one with its own frustum. For each pixel, there is a depth value, which represents distance to a surface. During raymarching, the renderer is looking for the surface which first intersects the projected ray. The ray in FIGS. 3B to 3D can be one of the rays 340 of FIG. 3A.

Figure 3C:
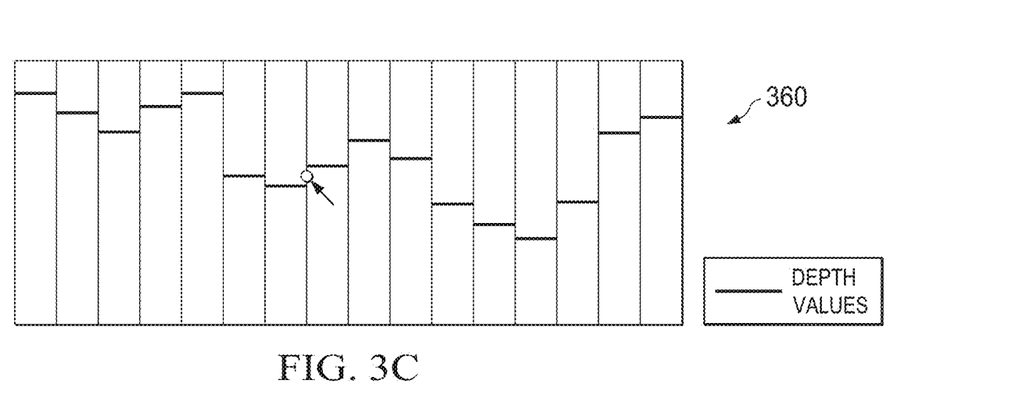

FIG. 3C illustrates the frustum 360, transformed into post-projection space to make it simpler to work with: pixels correspond to boxes instead of generic frusta. In FIG. 3C the depth buffer is a simple height map. The renderer can use the height map by comparing each surface along the ray to the ray itself.

Figure 3D:
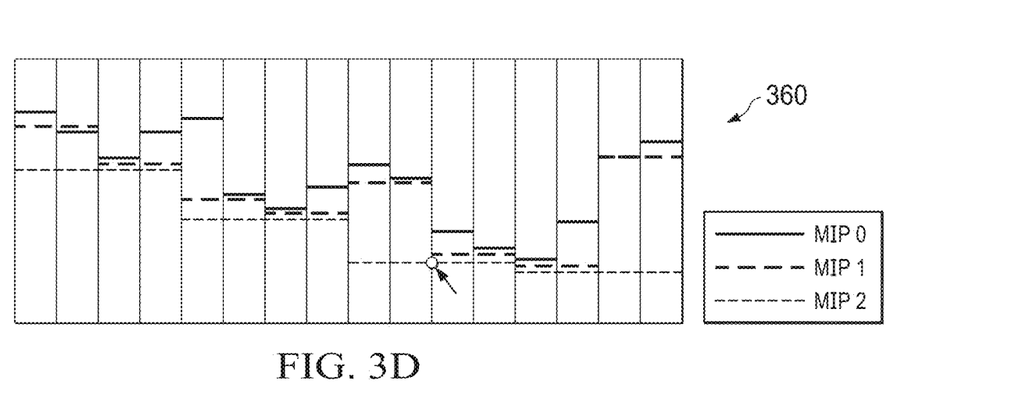

FIG. 3D provides a more efficient use of depth information. In FIG. 3D two lower resolution mipmap levels, 1 (red) and 2 (green) are added. With the additional mipmap levels, the renderer can march through the surfaces of level 2 until one is hit by the ray. Then the renderer switches to the level one surfaces until one is hit by the ray. Finally, the renderer switches to level 0 surfaces until the final hit is found.

Normally raymarching happens with one view wherein a ray is projected and marched until a surface is found. The disclosed rendering process can march a ray through an entire cube map at once. The raymarching algorithm detects which face to start with, then does raymarching in that face, and then to a different face when the ray goes out of that face to the different face. The first face to start with can be the face that has the ray origin inside of the faces' frusta; then raymarching starts with that face. When the ray origin is near the center of the cubemap, outside of the frusta, then the first face is the face that intersects with the ray first. In some embodiments a simple ray-box intersection algorithm can be used to find that face and the intersection point, because the near planes of the six frusta form a cube. Each ray starts in a particular place in one face and once the ray hits a wall, like a wall separating faces, then the raymarching process is switched to that other face for that specific ray. The raymarching algorithm has access to all six faces of a cube map and knows geometry that connects them. As such, the rays can be processed sequentially through a cube map, from one ray to the next. In some embodiments, the rays can be processed in parallel. Switching between the different faces can occur in a shader program for each particular ray.

Figure 4:
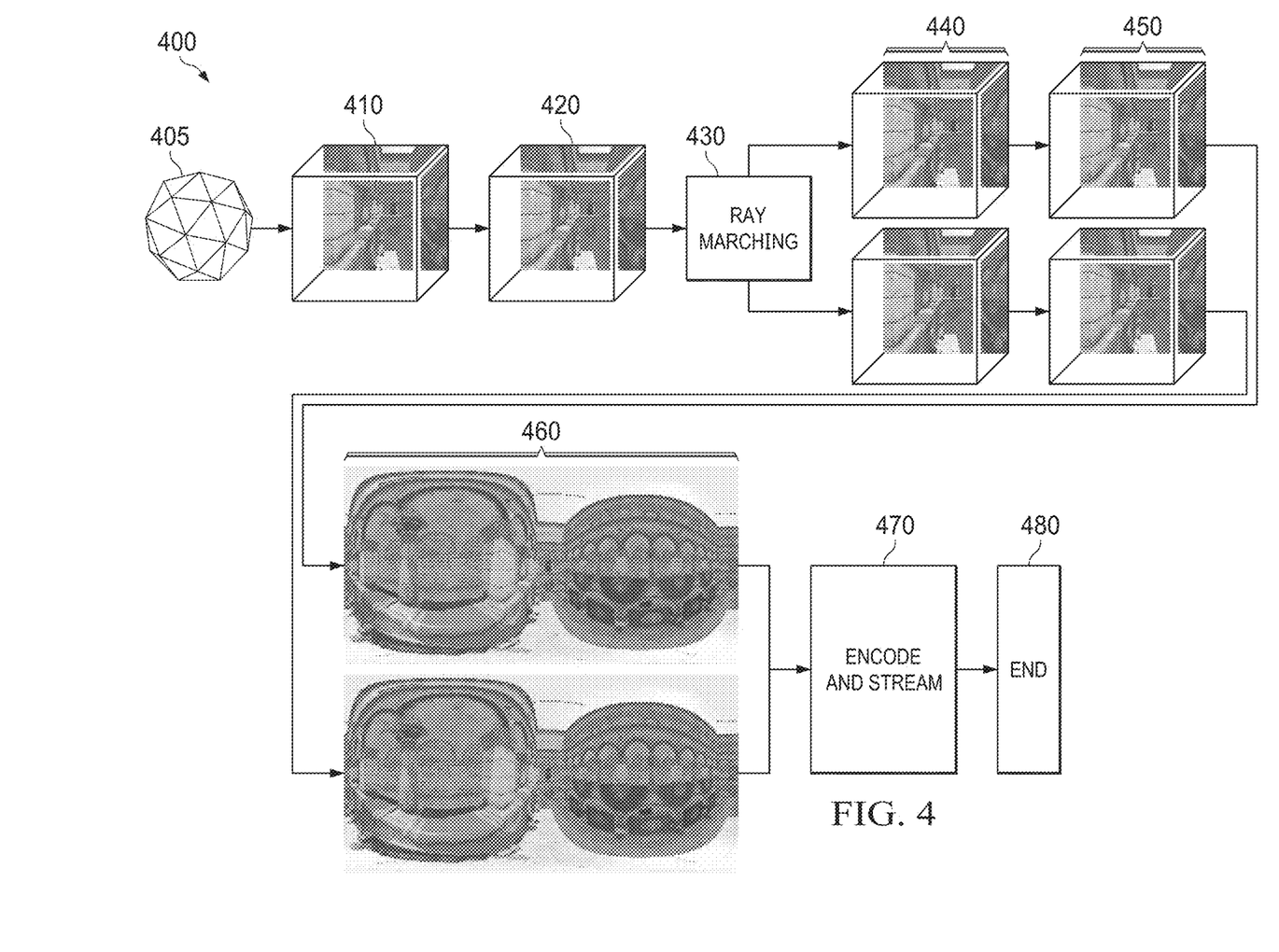
FIG. 4 illustrates an embodiment of a method of providing a stereoscopic panorama from a monoscopic set of rendered images carried out according to the principles of the disclosure.

FIG. 4 illustrates an embodiment of a method 400 of providing a stereoscopic panorama from a monoscopic cubemap. The method 400 can be performed by a virtual view broadcaster disclosed herein. In some embodiments, a renderer, such as a cloud based renderer, can perform at least some of the steps of the method 400. An application engine, such as a game engine, can be employed for some of the steps. The steps of the method 400 correspond to an algorithm that generates stereoscopic images from monoscopic images as disclosed herein. The method 400 begins in step 405 with the intent to render an opaque geometry into a cubemap.

In a step 410, the opaque geometery is rendered into a cubemap. A conventional method of rendering a cubemap can be employed. In a step 420, pre-translucency effects are applied to the rendered cubemap. The pre-translucency effects can include screen space ambient occlusion (SSAO) and screen space reflections (SSR).

In a step 430, a stereoscopic pair of cubemaps are generated from the rendered monoscopic cubemap using raymarching and employing the depth information from the cubemap. In one embodiment, the stereoscopic pair of cubemaps are extrapolated from the rendered monoscropic cubemap. A renderer can convert the rendered monoscopic cube map to the stereoscopic pair of cube maps employing raymarching. As illustrated in FIGS. 3A to 3D, raymarching finds a surface represented by a depth buffer that intersects with a projected ray. The raymarching algorithm can be located in an application engine. In some embodiments, the raymarching function can be extracted as a library and provided separately from an application engine.

Figure 8:
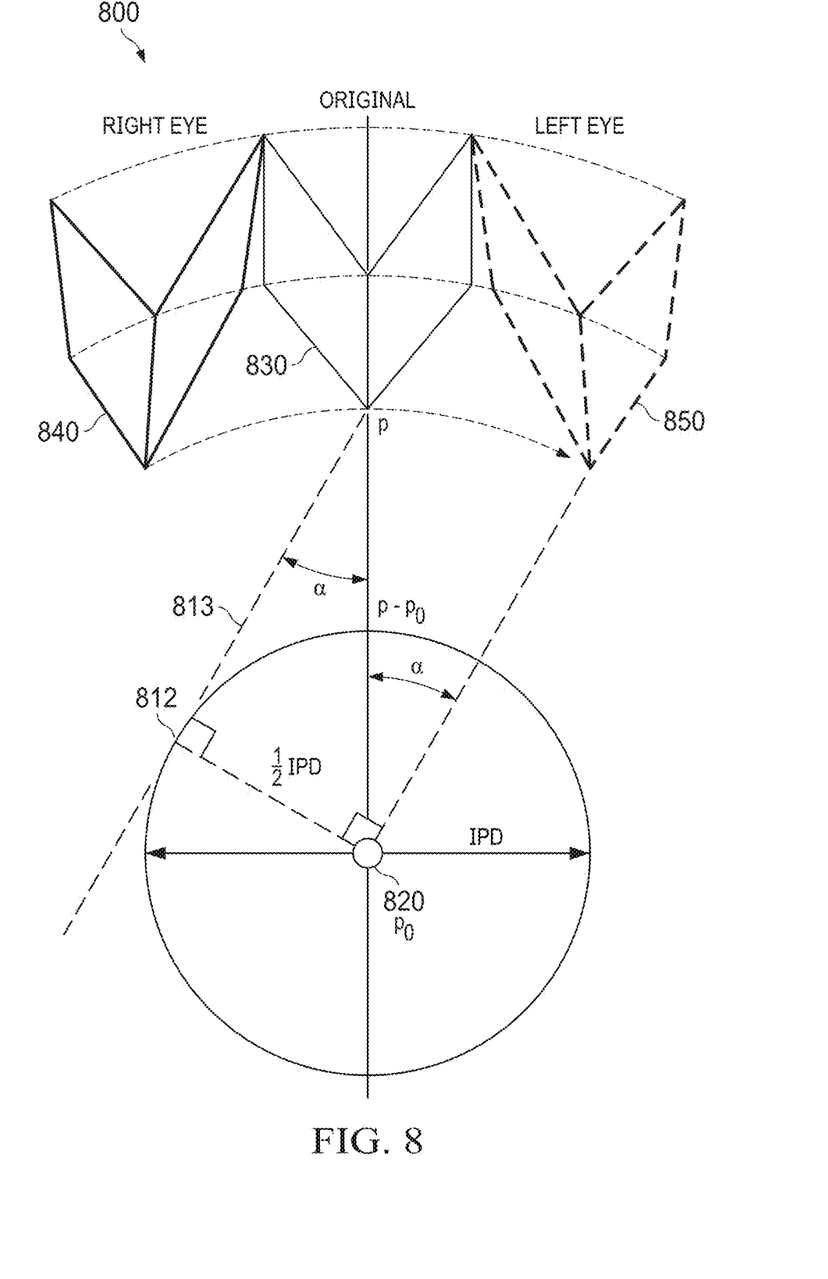
FIG. 8 illustrates a diagram of an example of applying translucency in stereo according to the principles of the disclosure.

In a step 440, translucency is rendered into both cubemaps of the stereoscopic pair of images. In one embodiment, the translucency is rendered after raymarching with a Vertex shader to match the circular projection. In these embodiments, geometry information for translucent objects is available. In the vertex shader, the geometry, such as the position of the vertices of the geometry, is rotated around the vertical axis that goes through the center of the projection circle and corresponds to the viewer position. The rotated geometry can then be rasterized, shaded as usual (i.e., conventionally), and written into the cubemap faces. The amount of rotation can be determined by distance to the object. The rotation is intended to match the circle of projection obtained by raymarching. FIG. 8 provides an example of dealing with translucency in stereo and matching the circle of projection.

The method 400 continues to step 450 where post-translucency effects are applied to both cubemaps of the stereoscopic pair. Tone mapping is an example of the post-translucency effects that can be applied.

In a step 460, projections are generated for streaming. The projections are generated for both stereoscopic pair of images. Various types of projections can be generated for streaming, including equirectangular, Boggs Eumorphic, cube maps, and pyramids. In a step 470, the projections are then encoded and streamed to client computing devices, such as HMDs. The method then ends in a step 480.

Figure 5:
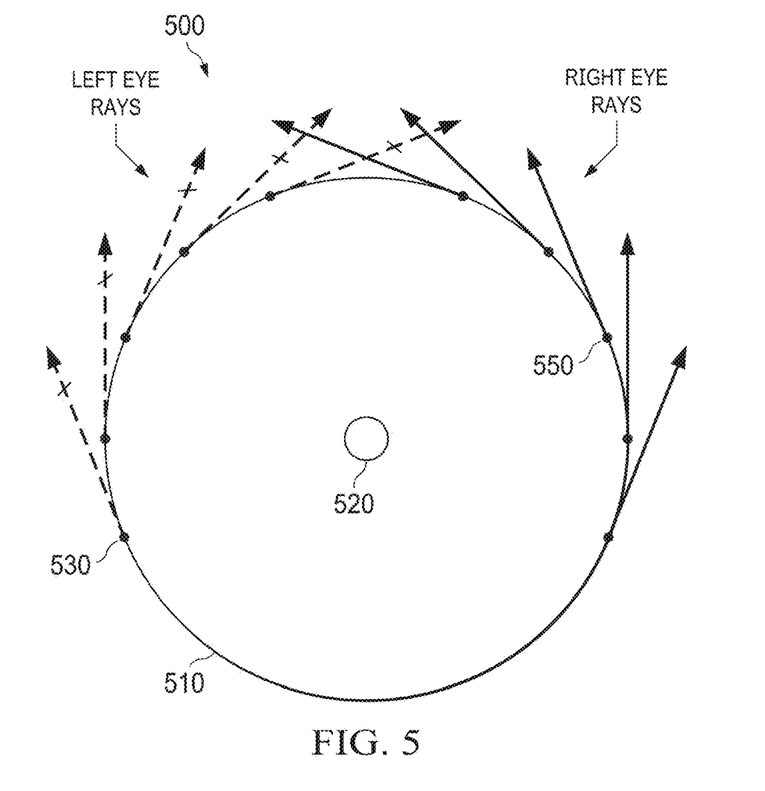
FIG. 5 illustrates a diagram of an example of omnidirectional stereo (ODS) projection that is employed in converting a monoscopic set of rendered images to a stereoscopic pair of images according to the principles of the disclosure.

FIG. 5 illustrates a diagram of an example of an omni-directional stereo projection according to the principles of the disclosure. FIG. 5 illustrates a projection circle 510 having a projection center 520 and multiple rays emanating from projection points on the projection circle 510 that approximate a circular projection. For computing a regular perspective projection, the origin is the projection center 520 (eye position) and the direction can be computed using the view and projection matrices and pixel coordinates. Using the disclosed rendering processes, a viewpoint can be shifted wherein rays are traced from multiple points on the projection circle 510. The original rendered image (non-circular) from the original viewpoint is employed as source data for tracing rays from points on the projection circle 510. A couple of the projection points, 530 and 550, are denoted in FIG. 5. Projection point 530 is a projection point for a left eye view and projection point 550 is a projection point for a right eye view. The left and right projection points 530, 550, correspond to the same viewing direction and are opposite points on the projection circle 510.

A difference between computing a regular perspective projection from the projection center 520 and a stereoscopic panorama is in computing the desired ray origin and direction for each output pixel. For computing the stereoscopic panorama, the direction can be computed based on the output pixel coordinates in the panorama, and the ray origin is computed based on the panorama center and the direction wherein the ray origin is located on the projection circle 510. For example, projection point 530 or 550 can be the ray origins on the projection circle 510. Thus, when computing panorama views, regardless whether the projection or layout of rendered views is a cube or an equirect, for each output pixel the disclosed method can determine a view direction in which the pixel corresponds. For example, having an equirectangular projection, for an x, y, pixel location geometry can be used to determine the view direction. For stereo panorama the projection point lies on the projection circle. Given a direction the projection point is adjusted to lie on the projection circle 510.

FIG. 6 illustrates a diagram 600 that provides an example of determining pixel colors for a left eye and a right eye with respect to a cube map according to the principles of the disclosure. The diagram 600 illustrates using ODS to project rays in a cube map to determine the color for a left eye pixel 633 and a right eye pixel 635 at a single point on the face of a monoscopic cube map 630. The left and right eye pixel colors for each point on each face of the cube map 630 can be similarly determined. Advantageously, ODS projection with raymarching can be used by a renderer to convert a rendered monoscopic cube map to a stereoscopic cube map. A renderer, such as the renderer 211 in FIG. 2, can be configured to perform the steps corresponding to the algorithm represented by the diagram 600.

The diagram 600 includes a projection circle 610, having a projection center 620, positioned within a cube map 630. A single side of the face 631 of the cube map 630 is denoted in FIG. 6. At a single point on the face 631 are a left eye pixel 633 and a right eye pixel 635. To determine which color should be visible for the left eye pixel 633 and the right eye pixel 635 at the point on the face 631, a projection line 640 is constructed from the point of the face 631 to the projection center 620. Projection points on the projection circle 610 for the left eye and the right eye are then determined by the intersection of a perpendicular line 642 on the projection circle 610. The perpendicular line 642 is perpendicular to the projection line 640 through the projection center 620. Projection points for the left eye 612, and the right eye 614 are located on the projection circle 610 where the perpendicular line 642 intersects the projection circle 610. From the left eye projection point 612 and the right eye projection point 614, rays are traced in the same direction as the projection line 640 from the projection center 620 to the point on the face 631 of the left eye pixel 633 and the right eye pixel 635. In other words, the rays from the projection points 612 and 614 are parallel to the viewing direction of the projection line 641. When the rays hit a first object, then the color of that object is used for the left eye pixel 633 and the right eye pixel 635, respectively. For example, when the left eye ray 652 hits object 662, the color of that object 662 is used for the left eye pixel 633. Similarly, when the right eye ray 654 hits object 664, the color of that object 664 is used for the right eye pixel 635. This process is repeated for each eye position of every viewing direction for each pixel on the cube map.

Figure 7:
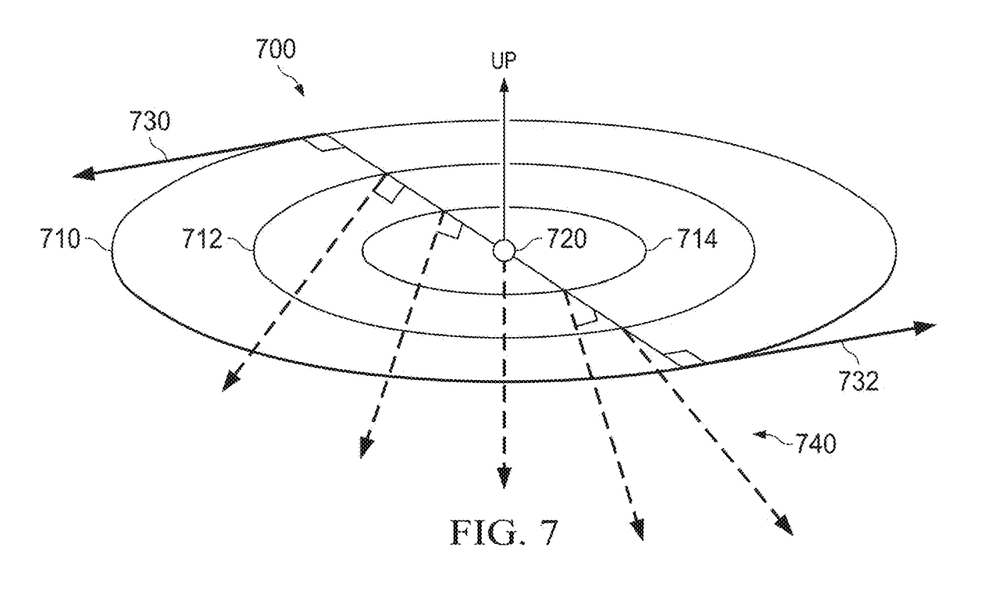
FIG. 7 illustrates a diagram of an example of for removing distortion from a stereoscopic cube map according to the principles of the disclosure.

FIG. 7 illustrates a diagram 700 of an example for removing distortion from a stereoscopic cube map according to the principles of the disclosure. Distortion can occur in some locations when rays are traced from a projection circle having the IPD diameter. Different colors can be obtained for pixels that are close together in a cube map resulting in distortion from top and bottom directions, often referred to as spiral distortion. A renderer, such as the renderer 211 in FIG. 2, can be configured to perform the steps corresponding to the algorithm represented by the diagram 700.

In order to remove distortion from top and bottom directions, the diameter of the projection circle is gradually reduced from the original diameter of one IPD for horizontal rays to zero for vertical rays. To represent this gradual reduction, diagram 700 includes a first projection circle 710, a second projection circle 712, and a third projection circle 714. Horizontal rays 730 and 732 are traced from the first projection circle 710 which is the original projection circle with the original diameter of IPD. For rays that are traced going up and down, collectively represented by rays 740 that are going down in diagram 700, the diameter of the projection circle for these rays is gradually reduced. In the diagram 700, this is represented by the rays 740 being projected from the second projection circle 712, and the third projection circle 714 so that the rays appear to be projected from the same projection point.

FIG. 8 illustrates a diagram 800 of an example of applying translucency in stereo according to the principles of the disclosure. Since un-ambiguous depth information is needed for rendering translucency, translucency cannot be rendered into a cube map before raymarching. After raymarching, however, depth information for every surface is available and translucency can be rendered for a stereoscopic cube map as disclosed herein.

Diagram 800 includes a projection circle 810 having a projection center 820. Diagram 800 also includes an object 830 that is an original monoscopic object, and right eye and left eye renderings of the object, denoted respectively as right eye object 840 and left eye object 850. When converting the original object 830 to the right eye object 840 and the left eye object 850 using rays from the projection circle 810, the vertices of the original object 830 are rotated around the vertical axis according to an amount that depends on the distance.

Diagram 800 illustrates an example of adjusting the position of vertices to convert a rendered monoscopic image to stereo. Before converting to stereo using the original object 830, positions of the vertices of the original object 830 are adjusted by rotation so each eye gets a different version of the object 830. For example, for the right eye, the vertices are shifted to the left and for the left eye the vertices are shifted to the right.

For example, a point on the original object 830, identified as p, is visible from projection point 812 as identified by a first projection line 813 constructed from p to the projection point 812. The radius from the projection center 820 to the projection point 812 is ½ IPd. A second projection line 814 constructed from the projection center 820 and that is parallel to the first projection line 813 indicates where the point p will actually appear on the cube map. Therefore, the point p needs to be rotated by an angle alpha around the center axis between point p and the projection center 820 ($p_0$). The sine of alpha equals the radius divided by distance between point p to the projection center 820 as represented by Equation 1 below.

$$\sin \alpha = \frac{\pm IPD}{2 \| p - p_0 \|}$$

Compared to conventional methods, the disclosed apparatus, schemes, and rendering methods are different in that depth information in addition to color information is used, which makes it possible to re-project the images to different viewpoints, not just different viewing directions.

This is an improvement of traditional ways to capture stereo panoramas wherein a small number of images are usually stitched together, and the broken depth and stitching artifacts are dismissed as something you just have to live with. The disclosure provides the advantage of rendering less, one monoscopic view, and then converting the monoscopic view to stereoscopic. Regular rasterization can then be used to render projections without distortion.

Some image processing algorithms are traditionally used that attempt to reduce the stitching artifacts by analyzing images using computer vision algorithms such as optical flow. Even if effective, these image processing algorithms require lots of input images to produce a good result, and analysis takes a long time. Some VR HMD drivers, may use a reprojection technique to adjust the images rendered by the application to a slightly newer orientation of the HMD. This may be referred to as "timewarp". However, only color information is used and the reprojection shader is tried to be made as fast as possible, so they can only correct the projection orientation, not viewpoint.

The improved rendering process disclosed herein allows the generation of a pair of stereoscopic images in real time while rendering only a monoscopic set of images, such as a cube map, thus keeping the rendering cost relatively low, and generating a panorama with high quality stereo effect. For additional quality improvement, a dual layer cube map can be used. In some embodiments, the disclosed rendering process can be used for Nvidia Ansel stereo panoramas, by the game providing Ansel runtime with its depth buffer and depth projection parameters. Ansel is an advanced virtual photography tool for games that allows users to capture various kinds of pictures from games, including regular screenshots, high-resolution screenshots, mono and stereo 360-degree panoramas. With Ansel, a user can compose screenshots from any position, adjust them with post-process filters, capture HDR images in high-fidelity formats, and share them in 360 degrees using your mobile phone, PC, or VR headset.

Accordingly, the above-described system, apparatus, and methods or at least a portion thereof may be embodied in or performed by various processors, such as digital data processors or computers, wherein the computers are programmed or store executable programs of sequences of software instructions to perform one or more of the steps of the methods. The software instructions of such programs disclosed herein may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the methods described herein or components of the apparatuses described herein.

Certain embodiments disclosed herein can further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method of providing stereoscopic images, comprising:
    generating a monoscopic cube map of rendered images, wherein the rendered images are computer-generated images; and
    converting the monoscopic cube map of the rendered images into a stereoscopic pair of images by raymarching employing depth information from the monoscopic cube map of the rendered images and projecting rays on each face of the monoscopic cube map employing omni-directional stereo (ODS) projection.

2. The method as recited in claim 1 wherein the monoscopic cube map of the rendered images includes both a color buffer and a depth buffer, and the stereoscopic pair of images are a stereoscopic pair of cube maps.

3. The method as recited in claim 2 wherein the converting includes determining a color for left eye pixels and a color for a right eye pixels for single points on a face of the monoscopic cube map.

4. The method as recited in claim 3 wherein the raymarching includes determining, employing the depth buffer, surfaces on the face that intersect with the rays.

5. The method as recited in claim 4 wherein the depth buffer includes mipmap levels and the raymarching includes employing the mipmap levels to determine the surfaces on the face that intersect with the rays.

6. The method as recited in claim 3 wherein the face is one of six faces of the monoscopic cube map and the converting includes the ODS projection projecting rays on each of the six faces to determine left and right eye pixel colors for points on each of the six faces employing the raymarching.

7. The method as recited in claim 6 wherein the raymarching selects the face to start with based on an origin of one of the rays.

8. The method as recited in claim 3 further comprising reducing a diameter of a projection circle of the ODS projection to remove spiral distortion of the stereoscopic pair of images.

9. The method as recited in claim 1 further comprising rendering translucent geometry for each of the stereoscopic pair of images after the raymarching.

10. The method as recited in claim 9 further comprising reprojecting the stereoscopic pair of images for video transmission.

11. The method as recited in claim 1 wherein the monoscopic cube map of the rendered images is a 360 degree monoscopic cube map of the rendered images and the stereoscopic pair of images is a 360 degree stereoscopic pair of cube maps.

12. A virtual view broadcaster, comprising:
    a cloud-based renderer configured to generate a 360 degree monoscopic cube map of rendered images and convert the 360 degree monoscopic set of rendered images into a 360 degree stereoscopic pair of images by raymarching employing depth information from the 360 degree monoscopic cube map of rendered images and projecting rays on each face of the 360 degree monoscopic cube map employing omni-directional stereo (ODS) projection, wherein the rendered images are computer-generated images; and
    an image processor configured to encode the stereoscopic pair of images for video transmission.

13. The virtual view broadcaster as recited in claim 12 further comprising a video transmitter configured to transmit the 360 degree stereoscopic pair of images as a video stream over a communications network.

14. The virtual view broadcaster as recited in claim 12 wherein the 360 degree monoscopic cube map of the rendered images includes both a color buffer and a depth buffer, and the 360 degree stereoscopic pair of images are a stereoscopic pair of cube maps.

15. The virtual view broadcaster as recited in claim 14 wherein said projecting determines a color for left eye pixels and a color for right eye pixels for single points on each of the faces of the monoscopic cube map.

16. The virtual view broadcaster as recited in claim 14 wherein the raymarching includes employing the depth buffer for determining surfaces on the each face of the monoscopic cube map that intersect with projected rays.

17. The virtual view broadcaster as recited in claim 12 wherein the cloud-based renderer is further configured to render translucent geometry for each of the stereoscopic pair of images after the raymarching.

18. A cloud-based renderer, comprising:
a memory; and
at least one processor coupled to the memory and configured to convert a monoscopic cube map to a stereoscopic pair of cube maps by raymarching employing a depth buffer of the monoscopic cube map, and by projecting rays on each face of the mono scopic cube map employing omni-directional stereo (ODS) projection.

19. The cloud-based renderer as recited in claim 18 wherein projecting the rays determines a color for left eye pixels and a color for right eye pixels for single points on each of the faces of the monoscopic cube map.

20. The cloud-based renderer as recited in claim 18 wherein the processor is further configured to render translucent geometry for each of the stereoscopic pair of cube maps after the raymarching.

21. The cloud-based renderer as recited in claim 18 wherein the at least one processor is further configured to generate the monoscopic cube map.

\* \* \* \* \*